July 3, 1945.      F. A. STUHLMAN      2,379,840
CONTROL FOR PLATENS
Filed Dec. 1, 1941      3 Sheets-Sheet 1
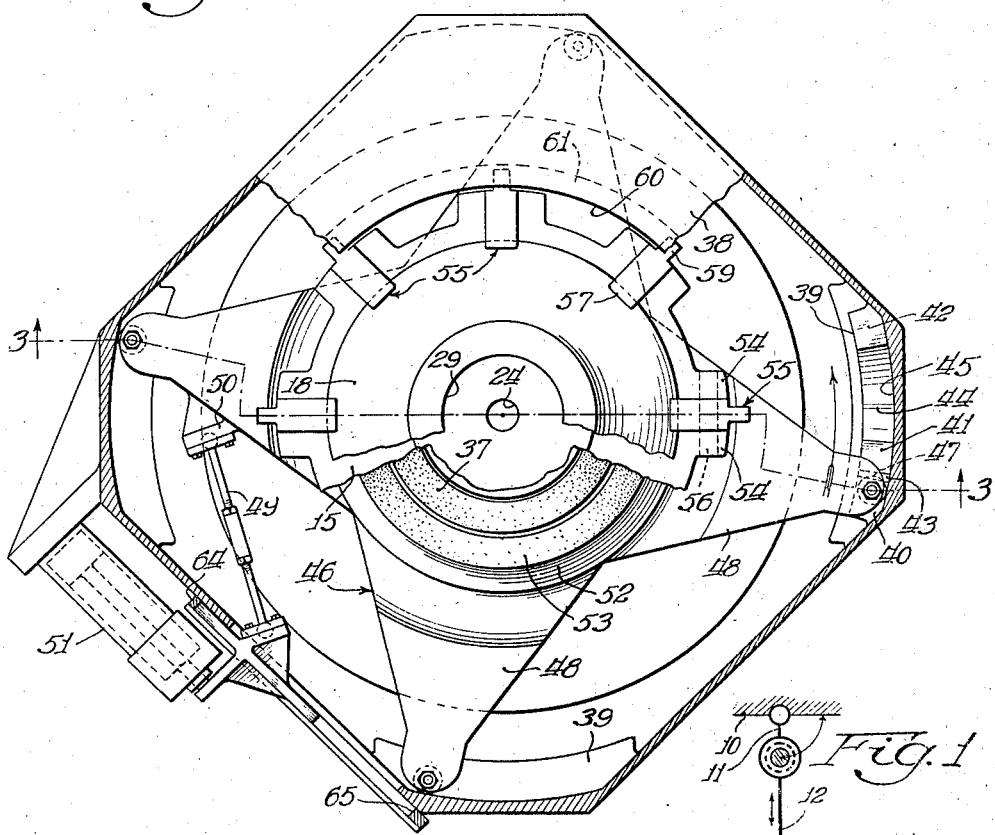
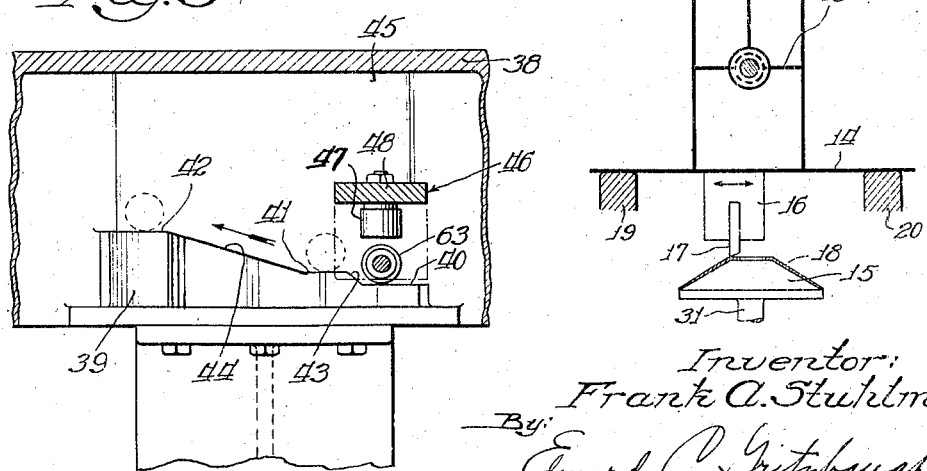
Inventor:
Frank A. Stuhlman
By Edward C. Fritzbaugh
Atty

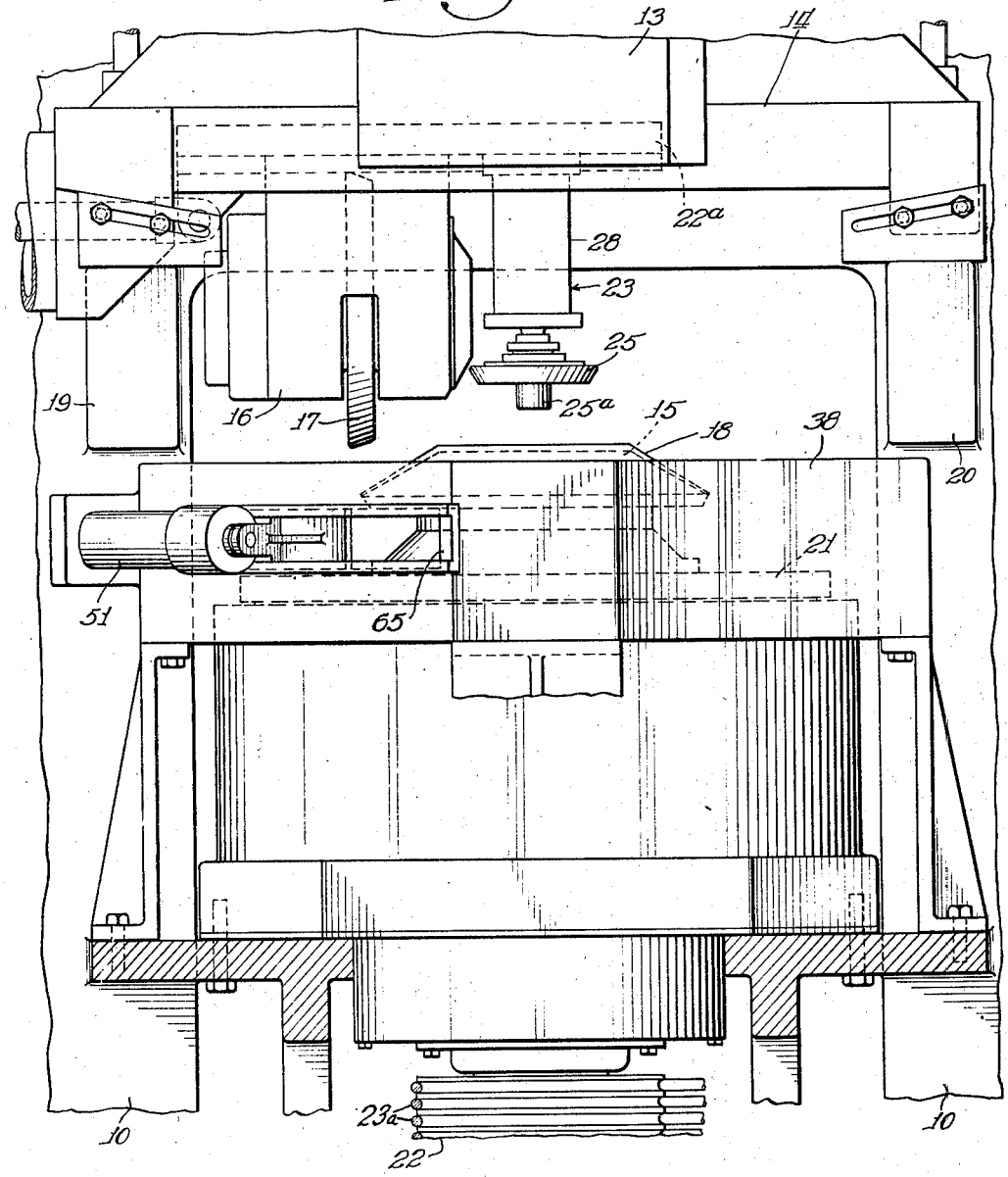

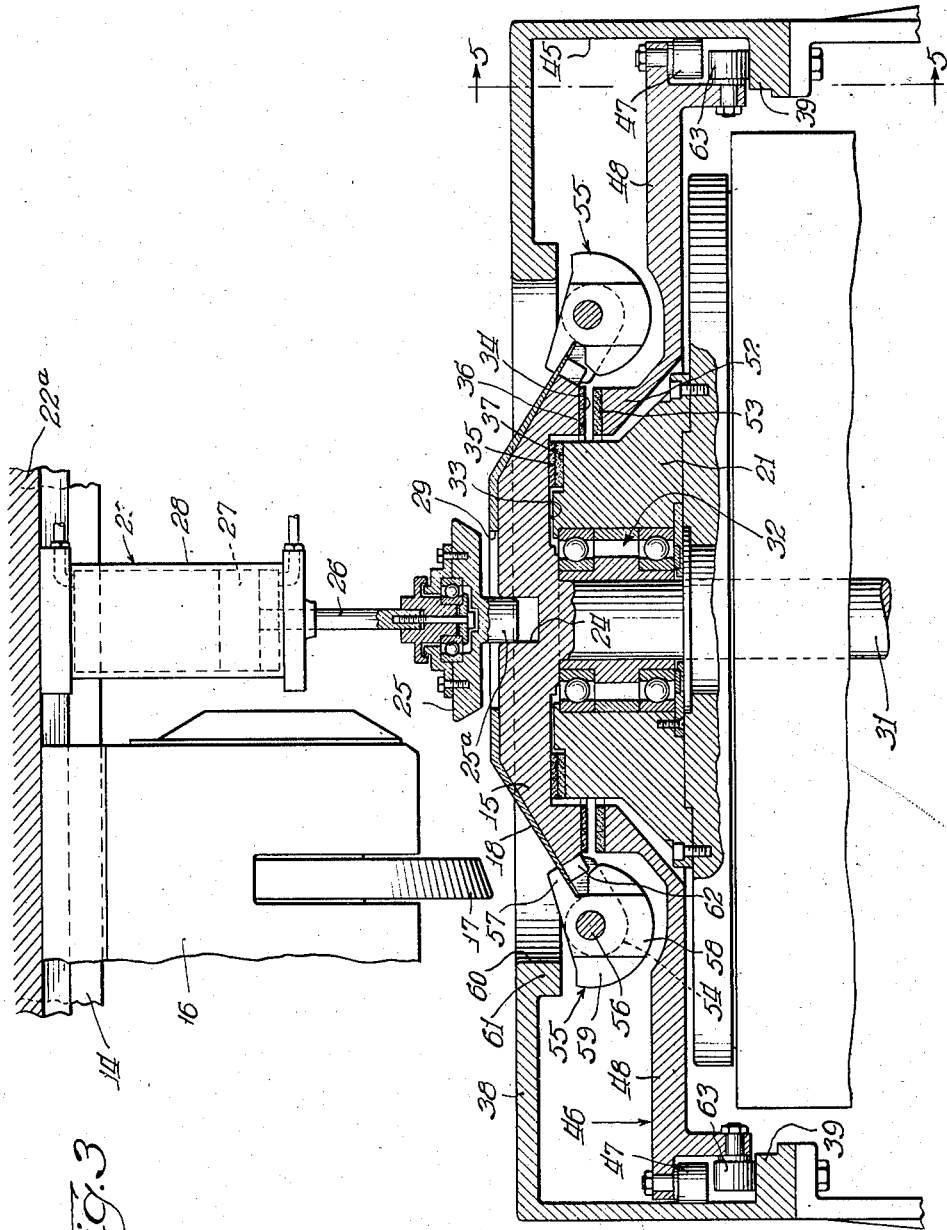

Patented July 3, 1945

2,379,840

UNITED STATES PATENT OFFICE 2,379,840

CONTROL FOR PLATENS

Frank A. Stuhlman, Forest Park, Ill., assignor to Borg-Warner Corporation, Chicago, Ill., a corporation of Illinois Application December 1, 1941, Serial No. 421,159

10 Claims. (Cl. 80—16)

This invention relates to machines for forming blanks on a rotatable platen, and particularly to a disc rolling machine.

The principal object of this invention is to provide an improved control means for the rotatable platen of a disc rolling machine or the like wherein said platen may be intermittently driven from a continuously rotating drive member, with means for arresting the rotation of the platen when said platen is not being driven.

Another object of this invention is to provide a control means for a rotatable platen for a disc rolling machine or the like wherein the same control means also operates other mechanisms necessary for the successful formation of a blank.

Another object of the invention is to provide a clutch and a brake for a rotatable platen, and a common means for operating both in sequence.

These and other objects and features of this invention will become apparent from the following detailed description when taken together with the accompanying drawings in which:

Fig. 1 is a schematic diagram of the essential linkages used in the machine;

Fig. 2 is a fragmentary front elevation of a machine having a linkage as shown in Fig. 1, the view emphasizing the portion of the machine including the platen;

Fig. 3 is a section taken through the novel platen and control means therefor taken on lines 3—3 of Figure 4;

Fig. 4 is a plan view, partly in section, of the platen and control means; and

Fig. 5 is a fragmentary enlarged elevation of the cam means for controlling the platen taken along lines 5—5 of Fig. 3.

Referring now to the drawings for a detailed description of the invention and particularly to Fig. 1, the machine is comprised of a frame 10 on which is supported an oscillatable crankshaft 11, having suitable means (not shown) for effecting oscillation of the crank; a connecting rod 12, a cross head 13 and a work head 14 connected to the cross head 13. The oscillation of crankshaft 11 from the vertical dead center position shown to a position 90° removed therefrom effects a vertical movement of work head 14.

Beneath work head 14 is a blank supporting platen 15 which is rotatable in a manner hereinafter to be described. A roll carriage 16 is slidably mounted in roll head 14 for transverse movement relative to platen 15. Said carriage 16 supports a roll 17 which is adapted to contact a blank 18 on the platen to roll and spin the blank to some desired form. Suitable abutments 19 and 20 on frame 10 cooperate with work head 14 to limit its downward movement relative to work support 15 and thereby regulate the thickness of the blank 18 as it is rolled.

Platen 15 (Figs. 2 and 3) is adapted to be driven from a rotatable platform 21, which, in turn, is adapted to be driven through suitable mechanism (not shown) from a pulley 22 and a rope drive 23a connected to a prime mover (not shown). Roll carriage 16 is secured to a slidable plate 22a, as is likewise a centering device 23 which is used to center a blank on platen 15.

Referring particularly now to Fig. 3, platen 15 is formed with a central aperture 24 into which may be piloted an extension 25a of a conical plate 25 which is rotatably secured to a piston rod 26. Said piston rod is in turn operated by a piston 27 in a cylinder 28 secured to plate 22a. Movement of piston 27 downward when cylinder 28 is properly aligned with platen 15 causes conical plate 25 to be piloted in aperture 24 and accordingly, said plate 25 will be perfectly concentric with platen 15. It is contemplated that blank 18 will be furnished with a central aperture 29 into which conical plate 25 is adapted to fit. Thus when a blank 18 is placed upon platen 15, it may be centered thereon by lowering conical plate 25 with extension 25a piloted in platen 15 until plate 25 contacts the central aperture of the blank, and due to the conical nature of the plate, the blank will be automatically centered on the platen.

Platen 15 is provided with a relatively long central shaft 31 which is received in bearings 32 supported on rotatable platform 21. The under side of platen 25 is formed with two axially spaced coaxial surfaces 33 and 34 to which are secured suitable friction facings 35 and 36, respectively. Platform 21 is provided with a friction surface 37 which is adapted to engage friction surface 35, and when so engaged the two friction surfaces constitute a clutch for driving platen 15. It should be noted at this point that platen 15 is movable axially relative to driving platform 21 so that it may be raised or lowered with reference to the platform to disengage and engage the clutch.

Overlying platform 21 is a guard 38 which is rigidly secured to frame 10 so as to be stationary. Said guard is provided with a plurality of plate cams 39 (Figs. 4 and 5) which may be curved, the center of curvature coinciding with the center of rotation of the platen. Cams 39 are provided with dwells 40, 41 and 42 connected by inclines 43 and 44. The surface 45 of guard 38 immediately adjacent the cam is likewise curved about a center coinciding with the center of rotation of the platen. Resting on cams 39 is a four-armed, star-shaped spider 46 which is centered relative to the platen by means of rollers 47 secured to the ends of the arms 48 thereof and contacting curved surfaces 45. The weight of the spider is taken on rollers 63 which ride on cams 39. It is contemplated that spider 46 will be oscillated through an arc including dwells 40 and 42 of cams 39, the oscillating means being comprised of a link 49 pivotally mounted on a lug 50 extending from spider 46, and a prime mover 51, such as a hydraulic cylinder or other reciprocable power means, which is pivotally connected to link 49. The limits of the arc are defined by stops 64 and 65 cooperating with prime mover 51. While spider 46 is in either one of its limiting positions as defined by the stops it is of course stationary. In any intermediate position its speed can be regulated, or it can be made to stop.

Spider 46 is formed at its center with an axially offset annulus 52 (Fig. 3) which is of substantially the same diameter as friction surface 36 of platen 15. Annulus 52 is likewise provided with a friction facing 53 and it is contemplated that said friction facing 53 will be engaged with friction facing 36 to form a brake for platen 15.

The various dwells and inclines of cams 39 are so arranged that incline 43 will bring friction facings 53 and 36 into engagement and will subsequently disengage friction facings 35 and 37 to break the drive from platform 21 to platen 15. Dwell 41 holds platen 15 in a clutch-released, brake-applied position for a short period to permit the platen to come to rest, and incline 44 then raises platen 15 sufficiently to operate a clamp releasing mechanism which will now be described.

Platen 15 is provided with pairs of spaced lugs 54 between each pair of which is received a centrifugal clamp 55 which is pivotally mounted between the lugs by means of a pin 56. As shown in Fig. 3, each clamp is comprised of a finger 57, which is adapted to clamp the edge of a blank 18 to the platen; an eccentrically mounted weight 58, and a lateral extension 59. Guard 38 has a central opening 60 which is defined by a flange 61 overhanging extensions 59 on clamps 55.

It is contemplated that clamps 55 will be maintained with fingers 57 out of contact with blank 18, but overhanging the edge thereof when platen 15 is at rest, so that blank 18 may not be removed from the platen, even when the platen is not rotating, until fingers 57 are rotated out of the way. It is also contemplated that when fingers 57 are rotated out of the way, weights 58 will pass through slots 62 in the platen and engage the under side of the blank to raise the blank off the platen, thereby permitting an operator to insert a pair of tongs under the blank and remove the blank from the machine. To this end, flange 61 on guard 38, extension 59 on clamp 55, friction surface 53 on annulus 52 of spider 46, and incline 44 on cam 39 are so related that during the movement of rollers 63 upwards along incline 44, platen 15 will be raised to cause extension 59 to strike flange 61 of guard 38 and rotate the clamp radially outwardly until dwell 42 is reached. At this point fingers 57 no longer obstruct the movement of blank 18 off platen 15 and the blank may then be removed from the machine. While rollers 63 are on dwells 42 a new blank may be inserted into the machine, the blank resting on the protruding ends of weights 58. As the rollers descend along inclines 44, the weights are rotated so that the blank first comes to rest on platen 15 and then as the platen continues to move downwardly the clamps are rotated by the force of gravity to a position wherein fingers 57 overhang the edges of the blank. Continued downward movement engages friction surfaces 35 and 37 to start the platen rotating, the weight of the platen being relieved from surface 53 to release the brake. When platen 15 is rotating, centrifugal force causes weights 58 to fly radially outwardly, thereby causing the associated fingers 57 to clamp the edges of the blank firmly against the platen.

It will be observed that the apparatus described above provides a single control means which sequentially declutches the platen from the driving platform, arrests the rotation of the platen to effect a partial release of the centrifugally operated clamping means, rotates the overhanging protective fingers of the clamp out of the way after the platen has stopped rotating, and finally raises the blank from the platen to permit the operator to insert a pair of tongs under the blank preparatory to removing it from the platen.

Although the platen is not entirely at rest while rollers 63 are moving along incline 44, either upward or downward, and hence is not completely braked, it is nevertheless slowed down to the speed of the spider 46 and this, for all practical purposes, may be considered an effective braking action.

It is understood that the foregoing description is merely illustrative of a preferred embodiment of the invention and that the scope of the invention, therefore, is not to be limited thereto but is to be determined by the appended claims.

I claim:

1. In blank handling apparatus, the combination of a platen for supporting a blank, a rotatable support for the platen for rotating the platen, means for releasably holding the blank on the platen, a substantially stationary portion, means for relatively moving said platen, said support and said stationary portion for disengaging the platen from the support and for engaging the platen with the stationary portion for arresting the rotation of the platen, and means operative on such relative movement to release the means holding the blank on the platen.

2. In blank handling apparatus, the combination of a platen for supporting a blank, a rotatable support for the platen for rotating the platen, an oscillatable support for the platen, means for holding the blank on the platen, means for raising the blank from the platen, means for axially moving said oscillatable support on rotary movement thereof to engage the platen with the oscillatable support and disengage the platen from said rotatable support for arresting the rotation of the platen, and means operative on such axial movement of the oscillatable support to release the means holding the blank on the platen and render operative said blank raising means to raise the blank from the platen.

3. In apparatus for controlling the movement of a blank supporting platen, the combination of a blank supporting platen, said platen being disposed in a substantially horizontal plane and rotatable about a vertical axis, a pair of concentric axially spaced friction facings on the platen, a rotatable support adapted to engage one of the friction facings whereby to drive the platen, an oscillatable support for the platen adapted to engage the other friction facing on the platen to stop the rotation thereof, and means for causing relative movement between said platen, said rotatable support and said oscillatable support toward and away from each other on oscillation of the latter support for alternately engaging the platen with one or the other of the supports whereby alternately to drive and brake the platen and the blank supported thereon.

4. In apparatus as described in claim 3, said platen being movable axially relative to the rotatable support, and said oscillatable support being movable axially with respect to the rotatable platen whereby the platen may be disengaged from the rotatable support while it is engaged with the oscillatable support.

5. In apparatus for controlling the movement of a blank supporting platen, the combination of a blank supporting platen, a rotatable support for the platen, an oscillatable support for the platen, a fixed guard adjacent the platen and means for moving the oscillatable support axially relative to the guard and rotatable support, said means comprising cams on the guard and rollers on the oscillatable support engaging the cams, and means for oscillating the said oscillatable support to cause the rollers to ride up and down the cams thereby to raise and lower the blank supporting platen.

6. In apparatus as described in claim 5, said guard having surfaces which are curved about a center coinciding with the center of rotation of the rotatable support, and means on the oscillatable support engaging the curved surfaces whereby to center the oscillatable support relative to the platen.

7. In apparatus for controlling the movement of a blank supporting platen, the combination of a blank supporting platen, a rotatable support for the platen concentric therewith, an oscillatable support for the platen, said oscillatable support being movable axially toward and away from the platen whereby to engage and disengage said platen, said oscillatable support comprising a spider having a plurality of arms, a guard fixed axially with respect to the rotatable support, curved surfaces on the guard concentric with the platen, cam surfaces on the guard adjacent to the curved surfaces, and rollers at the end of the arms engaging the curved surfaces and cams respectively, the curved surfaces serving to center the oscillatable support relative to the platen and the cam surfaces serving to engage the oscillatable support with the platen to arrest the rotation of the platen and then to raise the platen further to perform an additional function.

8. In apparatus for controlling the movement of a blank supporting platen, the combination of a blank supporting platen having a fixed axis of rotation, a first concentric rotatable support for said platen, means for rotating said first support, said platen being adapted to rest on said first support and to be rotated thereby, and a second support for said platen normally spaced therefrom, means mounting said second support providing for limited rotation of said second support, and cooperating means on said mounting and said second support effective in response to said limited rotation to move said second support along said axis into engagement with said platen for lifting said platen out of engagement with said driven support to disconnect the drive therewith and arrest the platen rotation.

9. In apparatus for controlling the movement of a blank supporting platen, the combination of a blank supporting platen disposed in a horizontal plane and rotatable about a fixed axis, a first concentric rotatable support for said platen, means for rotating said first support, said platen being adapted to rest on said first support and to be rotated thereby, and a second support for said platen normally spaced therefrom, means mounting said second support providing for limited arcuate movement of said second support relative thereto, and cooperating means on said mounting and said second support including cam surfaces, effective in response to said arcuate movement to move said second support along said axis into engagement with said platen for lifting said platen out of engagement with said driven support to disconnect the drive therewith and arrest the platen rotation.

10. In apparatus for controlling the movement of a blank supporting platen; the combination of an axially fixed rotatable support; a blank supporting platen adapted to engage said support and to be rotated thereby; a rotatably oscillatable, axially movable support for the platen; and means for axially moving said last named support when it is oscillated; said last named support being adapted to be moved by said last named means axially into engagement with the platen and move the platen off the rotatable support to arrest the rotation of the platen.

FRANK A. STUHLMAN.